R. Ketcham,
Fence Post,
Nº 61,838. Patented Feb. 5, 1867.
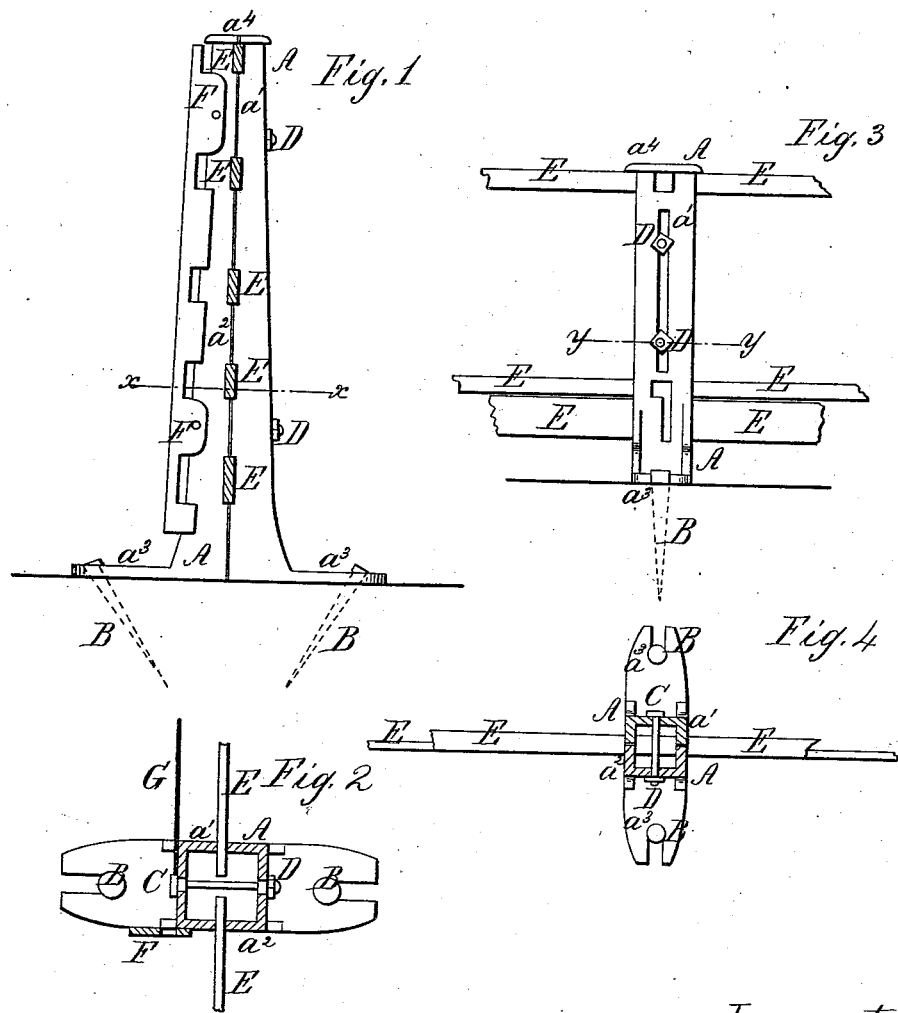

United States Patent Office.

RICHARD KETCHAM, OF SOUTH DANSVILLE, NEW YORK.

*Letters Patent No. 61,838, dated February 5, 1867.*

---

IMPROVEMENT IN FENCE POSTS.

---

The Schedule referred to in these Letters Patent and making part of the same.

---

TO ALL WHOM IT MAY CONCERN:

Be it known that I, RICHARD KETCHAM, of South Dansville, in the county of Steuben, and State of New York, have invented a new and useful Improvemet in Cast-Iron Fence Posts; and I do hereby declare that the following is a full, clear, and exact description thereof, which will enable others skilled in the art to make and use the same, reference being had to the accompanying drawings, forming a part of this specification, in which—

Figure 1 is a side view of my improved fence post, showing the ends of the boards in place.

Figure 2 is a horizontal section of the same, taken through the line $x\ x$, fig. 1.

Figure 3 is an edge view of my improved fence post, when adapted to a picket fence.

Figure 4 is a horizontal section of the same, taken through the line $y\ y$, fig. 3.

Similar letters of reference indicate like parts.

My invention has for its object to furnish an improved cast-iron fence post, so constructed as to hold the boards or rails of the fence securely without the use of nails; and it consists principally in forming the posts in two parts, with flanges on their lower ends to hold the posts erect, and with notches upon the corresponding edges of the two parts into which the ends of the boards or rails are inserted and clamped fast; in the combination with the posts of a detachable notched piece, to be applied when it is desired to replace a panel of the fence with a bar-way; in the combination with the posts of the iron spikes by which it is secured to the ground; and of a brace, to be applied when it is desired to hang a gate to said post, to prevent its swaying; the whole being constructed and arranged as hereinafter more fully described.

A is the post, which is cast in two parts, $a^1\ a^2$, as shown in figs. 1 and 4. $a^3$ are flanges, cast upon the lower ends of the parts $a^1$ and $a^2$ of the post A. These flanges $a^3$ extend out at right angles to the axis of the post, and have notches or holes formed in their ends for the reception of the iron spikes or stakes B, by means of which the posts A are secured to the ground. The spikes B should be made somewhat flattened, should be from one to two feet long, according to the character of the ground into which they are driven, and should be driven into the ground with their points inclined towards the posts, as shown in the drawings. The parts $a^1$ and $a^2$ of the posts are held together by bolts C and nuts D, and they have notches in their corresponding edges, which, when the parts are placed together, form mortises for the reception of the ends of the boards or rails E, which are securely clamped in place by screwing up the nuts D upon the bolts C. Notches are formed in the edges of the posts A, both for the purpose of making them lighter, and also for convenience in turning a corner. F is a notched bar, which is removably attached to the side of the posts A, as shown in fig. 1, where it is desired to form a bar-way, and allows the ends of the bars to slide past the said post. G is an iron brace, to be applied to the post A to prevent it from swaying when used as a gate post. The brace G is bent at the surface of the ground, so that its lower part, that is driven in the ground, may incline towards the post. The upper end of the brace G may be secured to the end of the bolt C, or secured to the post in any other convenient manner. When the post is designed to be used for a picket fence, all the mortises required are a square mortise in the upper and lower part, for the reception of the ends of the upper and lower rails, and a narrow mortise, for the reception of the ends of the bottom board; though other holes may be made through the post to make it lighter, and for ornamental purposes. The cap $a^4$ of the post A may be in one piece, formed upon one part of the post, and overlapping the end of the other part; or it may be in two pieces, half being formed upon the upper end of each part of the post, as shown in fig. 1.

I claim as new, and desire to secure by Letters Patent—

1. The combination of the iron spikes or stakes B with the flanges $a^3$ of the posts A, substantially as herein shown and described, and for the purpose set forth.

2. The iron brace G, notched bar F, in combination with the post A, when all constructed and arranged as herein set forth, as and for the purpose specified.

The above specification of my invention signed by me this 13th day of September, 1866.

RICHARD KETCHAM.

Witnesses:
 WM. F. MCNAMARA,
 JAMES T. GRAHAM.